(12) United States Patent
Orlovskiy

(10) Patent No.: US 10,392,057 B2
(45) Date of Patent: Aug. 27, 2019

(54) VEHICLE

(71) Applicant: Nikolay Vladimirovich Orlovskiy, Moscow (RU)

(72) Inventor: Nikolay Vladimirovich Orlovskiy, Moscow (RU)

(*) Notice: Subject to any disclaimer, the term of this patent is extended or adjusted under 35 U.S.C. 154(b) by 0 days.

(21) Appl. No.: 15/486,690

(22) Filed: Apr. 13, 2017

(65) Prior Publication Data

US 2017/0217511 A1 Aug. 3, 2017

Related U.S. Application Data

(63) Continuation-in-part of application No. PCT/RU2014/000880, filed on Nov. 21, 2014.

(30) Foreign Application Priority Data

Oct. 15, 2014 (RU) .............................. 2014141340

(51) Int. Cl.
*A63C 17/26* (2006.01)
*B62D 51/02* (2006.01)
(Continued)

(52) U.S. Cl.
CPC .......... *B62D 51/02* (2013.01); *A63C 17/0013* (2013.01); *A63C 17/12* (2013.01);
(Continued)

(58) Field of Classification Search
CPC .... A63C 17/12; A63C 17/0013; B62D 51/02; B60K 7/0007; B62M 6/00; B62M 6/45
See application file for complete search history.

(56) References Cited

U.S. PATENT DOCUMENTS 3,797,446 A * 3/1974 Cox .................... A63C 11/10
  180/180
4,456,089 A * 6/1984 Kuwahara .......... A63C 17/0013
  180/180

(Continued)

FOREIGN PATENT DOCUMENTS

DE   19819381 A1 * 4/2000 ............. A63C 11/10
FR    2812213 A1 * 2/2002 ............... A63C 5/08

(Continued)

OTHER PUBLICATIONS

Burns, Chris; Electric Wheel on a Stick, Jul. 22, 2009; retrieved from http://www.yankodesign.com on Sep. 16, 2017.*

*Primary Examiner* — James A Shriver, II
*Assistant Examiner* — Steve Clemmons
(74) *Attorney, Agent, or Firm* — Patshegen IP LLC; Moshe Pinchas

(57) ABSTRACT

A vehicle comprising a framework in form of beam, wheel, drive and braking system, while the vehicle is partially loaded with the weigh of user and the user stands on roller skates and holds the vehicle on the beam so that the wheel is behind the user and contacts with its tire the road surface; and when the user activates the drive, the wheel starts rotating and, as a result of friction between the wheel's tire and the road surface, there arises a force making the vehicle with user move. Additionally, another technique for operation of the same vehicle is being offered, at which the vehicle on the move is positioned in the front of user.

7 Claims, 3 Drawing Sheets

(51) Int. Cl.
*A63C 17/12* (2006.01)
*A63C 17/00* (2006.01)
*B60K 7/00* (2006.01)
*B60K 35/00* (2006.01)
*B60L 7/10* (2006.01)
*B60L 15/30* (2006.01)
*B60T 7/10* (2006.01)
*B62M 6/45* (2010.01)
*B62M 6/90* (2010.01)
*B60L 53/16* (2019.01)
*B60L 53/80* (2019.01)
*B60L 50/60* (2019.01)

(52) U.S. Cl.
CPC ............ *B60K 7/0007* (2013.01); *B60K 35/00* (2013.01); *B60L 7/10* (2013.01); *B60L 15/30* (2013.01); *B60L 50/66* (2019.02); *B60L 53/16* (2019.02); *B60L 53/80* (2019.02); *B60T 7/102* (2013.01); *B62M 6/45* (2013.01); *B62M 6/90* (2013.01); *B60K 2350/928* (2013.01); *B60L 2200/46* (2013.01); *B60L 2220/46* (2013.01); *Y02T 10/7005* (2013.01); *Y02T 10/7275* (2013.01)

(56) References Cited

U.S. PATENT DOCUMENTS

| | | | | |
|---|---|---|---|---|
| 5,385,210 A * | 1/1995 | Harvey | ............. | A63C 11/10 180/11 |
| D372,000 S * | 7/1996 | Searles | ............. | D12/1 |
| 5,562,176 A * | 10/1996 | Lucernoni | ......... | A63C 17/0013 180/180 |
| 5,687,991 A * | 11/1997 | Gairdner | ............. | A63C 3/00 135/85 |
| 5,721,473 A * | 2/1998 | DeVries | ............. | B60K 6/40 318/139 |
| 5,938,240 A * | 8/1999 | Gairdner | ............. | A63C 17/0013 135/85 |
| 6,100,615 A * | 8/2000 | Birkestrand | ........ | B60L 11/1807 180/65.51 |
| 6,193,003 B1 * | 2/2001 | Dempster | ............. | A63C 11/10 180/180 |
| 6,321,863 B1 * | 11/2001 | Vanjani | ............. | B60K 7/0007 180/206.5 |
| 6,467,559 B1 * | 10/2002 | Farrell | ............. | A63C 11/10 180/180 |
| 6,626,255 B1 * | 9/2003 | Timm | ............. | A63C 11/10 180/19.3 |
| 6,820,710 B2 * | 11/2004 | Fechner | ............. | B62K 11/14 180/170 |
| 8,297,148 B1 * | 10/2012 | Ferguson | ............. | B62K 21/125 74/551.4 |
| 8,403,085 B1 * | 3/2013 | Gilbert | ............. | B60K 7/0007 180/65.1 |
| 8,936,525 B2 * | 1/2015 | Shimada | ............. | B60K 7/0007 475/149 |
| 9,358,999 B2 * | 6/2016 | Nadeau | ............. | B62D 55/07 |
| 9,660,500 B2 * | 5/2017 | Huang | ............. | B62M 6/65 |
| 2006/0131084 A1 * | 6/2006 | Rupp | ............. | A63C 17/0013 180/65.1 |
| 2006/0170169 A1 * | 8/2006 | Humeau | ............. | A63C 3/04 280/11.19 |
| 2008/0257628 A1 * | 10/2008 | Pitt | ............. | A63C 17/0013 180/181 |
| 2011/0017539 A1 * | 1/2011 | Pitt | ............. | A63C 17/0013 180/180 |
| 2016/0082772 A1 * | 3/2016 | Biderman | ............. | A61G 5/045 301/6.5 |
| 2017/0106737 A1 * | 4/2017 | Gillett | ............. | B60K 7/0007 |

FOREIGN PATENT DOCUMENTS

| | | | | |
|---|---|---|---|---|
| GB | 2246751 A | * | 2/1992 | ......... A63C 17/0013 |
| NL | 1008786 C1 | * | 10/1999 | ............. A63C 17/12 |
| WO | WO-0045909 A1 | * | 8/2000 | ............. A63C 11/10 |

* cited by examiner

VEHICLE

FIELD OF INVENTION

The presently disclosed subject matter relates to vehicle, in general, and in particular to vehicles and can be utilized for the purposes of transport, leisure, sports and carriage of small cargoes.

BACKGROUND

Well known is the vehicle SEGWAY PT comprising two wheels on common axle (internet http://en.wikipedia.org/wiki/Segway_PT or http://www.segway.com). Between the wheels, there is a pad accommodating user holding on the control handlebar. Control over the vehicle is implemented by inclination of user's body. Upon inclining the user's body ahead, SEGWAY PT starts moving ahead, and the more is the inclination the more is the vehicle's speed; at user's inclination backwards the speed drops or the vehicles starts reverse movement. Vehicle's turn is implemented by turn of the control handle (on obsolete models) or rocking the steering post to the left or to the right (in new versions models). Each wheel has individual drive comprising electric motor and reducer. SEGWAY PT has an automated stabilization system comprising gyroscopic and liquid sensors, microprocessors, controllers and electric motors. Signals from the sensors arrive at microprocessors which generate control signals for controllers. As a result, controllers change the speed and direction of rotation of electric motors so as to return SEGWAY PT in an equilibrium condition. SEGWAY PT utilizes the self-balancing technique designed by Dean L. Kamen with fellow inventors (Indication system for vehicle—U.S. Pat. No. 5,794,730, Classes B60K7/00, A61G5/12, A61G5/06, B62D57/00, A61G5/10, A61G5/14, A61G5/04, 18, Aug. 1998; Personal mobility vehicles and methods—U.S. Pat. No. 6,302,230, Classes B62D61/12, B62D51/00, A63C17/08, B62D37/00, B62K1/00, B62D61/00, A61G5/06, A61G5/04, B62D51/02, A63C17/01, B60L15/20, 16, Oct. 2001). Drawbacks of this vehicle are: absence of passive stability, i.e. stability can be achieved only by means of operation of complicated electronics failure of which leads to the user's falling down; inability to negotiate curbs; while movement in pedestrians traffic, the vehicle can traumatize people; cannot move on the road with automobiles over the danger to user; high cost.

Well known is the vehicle designed by inventor Shane Chen from the USA (Powered single-wheeled self-balancing vehicle for standing user—Patent US20110220427, Classes B62K1/00, B62D61/00, 15, Sep. 2011). Based on this Patent, they produce a vehicle known as SOLOWHEEL. The vehicle SOLOWHEEL comprises one wheel and the system of automated stabilization of the user vertical position in the plane of rotation of the wheel. Wheel of SOLOWHEEL has a drive in form of integrated electric motor enclosed in casing. Two collapsible pads for feet are secured on the casing sides. The casing accommodates gyroscopic sensor which controls change in angle of inclination of the casing relative to vertical line in the plane of the movement direction. Signal from the gyroscopic sensor arrives at electronic control system which changes the electric motor speed so as to return SOLOWHEEL in vertical position. To start movement, electric power for SOLOWHEEL shall be fed, one foot placed on the pad, then user shall push himself off the road with another foot, then place another foot on free pad. When user inclines himself ahead, the speed of movement rises, when he inclines himself backwards—the speed drops or the vehicle stops. Movement direction can be changed by turning the vehicle with feet to the left or to the right or by increasing the feet pressure on one of the pads. Drawback of this vehicle is that its stabilisation by roll is implemented by user himself by means of balancing, i.e. by changing the centre of gravity position and changing the angle of inclination of the vehicle relative to vertical line. Such technique of keeping the equilibrium takes skills and preliminary training of user. Additionally, in this vehicle, failure of the system for automated stabilisation of user's vertical position will likely lead to falling down of user which is a drawback of SOLOWHEEL. Another drawback of SOLOWHEEL is the higher risk, as falling down from the vehicle from standing position can lead to trauma. It is worth noting that user of SOLOWHEEL, on the movement, holds the vehicle between his legs and cannot crouch so as to provide additional stability by lowering the centre of gravity when negotiating the irregularities of road pavement.

The most similar as to the task being solved is the vehicle designed by inventor William Pitt from the USA (Lightweight propulsion device for providing motive force to a skate equipment user—Patent US20110017539, Class A63C17/12, 25, Jun. 2010). This vehicle comprises framework, wheel with ability to rotate relative to the framework, drive and brake system; at that the drive is designed based on combustion engine mounted on the framework. To use the vehicle, user shall wear roller skates and start the vehicle's engine. Then user places the vehicle at his side, the wheel behind the user and the wheel tire not touching the road surface. To start movement, user pushes the throttle grip increasing the engine capacity and makes the wheel touch the road pavement. As a result of friction between the wheel and the road pavement, horizontal force arises, and the vehicle starts moving along with the user who is rolling on roller skates. User changes direction of movement by turning the roller skates. Drawback of this vehicle is that a combustion engine, during operation, emits exhaust gases—this makes exploitation of this vehicle impracticable in accommodations, in parks, on walkways and bicycle lanes. Another drawback of this vehicle is a higher physical stress on user owing to the place of engine mounting. Wheeled vehicle under normal conditions of operation shall have minimal slipping. To avoid slipping, user of the vehicle as per the Patent US20110017539 shall strongly press the vehicles's wheel down to the road pavement by continuous pressure on central grip which takes stress. It is worth noting that when engine is secured on a framework the weight of the engine is distributed between two fulcrums. One fulcrum is the point of contact of the wheel and the road pavement, another fulcrum is the user's feet also being on the ground. During use of this vehicle, the engine weight only is expected to exert the load of several kilograms on the end grip, and also user must press the appliance down to the ground with a central grip causing additional stress on the end grip; thus the user, on the movement, will have both hands loaded which is burdensome.

SUMMARY OF INVENTION

Declared is the vehicle comprising framework, wheel with ability to rotate relative to the framework, drive and brake system, featuring the framework in form of at least one beam which on one (its end has a wheel with integrated electric motor; another end of the beam features a place for embracing with one hand of the user, the middle part features a secured support grip intended for support of another hand of the user, while the center line of the support grip is parallel to the plane of rotation of the wheel, the support grip breaks out from the beam at an angle in such way that in working condition the support grip is positioned horizontally.

The vehicle can be manufactured with a grip on the second end of the beam positioned in parallel with the wheel's pivot.

The vehicle can be manufactured with additional grip at the second end of the beam positioned opposite the first grip and parallel to the wheel's pivot.

The vehicle can be manufactured with a secured, at the second end of the beam, stem with a rudder secured therein. Terms 'stem' and 'rudder' hereinafter mean the parts used in design of a bicycle rudder. Rudder, stem, beam and fork are rigidly interlinked.

The vehicle can be manufactured with a secured, at the second end of the beam, stem with an asymmetrical rudder secured therein; the righthand grip of the rudder is positioned in parallel with the wheel's pivot and the lefthand grip has a bend allowing the end of the lefthand grip to be positioned perpendicular to the wheel's pivot, while the end of the lefthand grip in working condition is positioned vertically. Rudder, stem, beam and fork are rigidly interlinked.

The vehicle differing in the following: the beam manufactured with a fork at the end, the wheel is secured in the fork and another end of the beam is bent and parallel to the wheel's pivot and serves as a grip.

The vehicle differing in the following: the beam has bends which provide the following by the framework of the user's body shape and allow the wheel to find itself behind the user in the plane parallel to the line of movement direction.

The vehicle differing in the following: the drive is supplemented with the reducer which is integrated in the wheel.

The vehicle differing in the following: transmission of torque to the wheel's rim is implemented through the overrunning clutch (in the literature also called 'free-wheel mechanism' and 'free-running coupling').

The vehicle differing in the following: at least one additional side wheel installed in parallel with the wheel.

The vehicle differing in the following: the use of mechanical brake in the braking system.

The vehicle differing in the following: the beam has plug connection.

The vehicle differing in the following: the beam is collapsible.

The vehicle differing in the following: electric motor power supply system comprises a controller for controlling the electric power being fed to the electric motor.

The vehicle differing in the following: the controller hardware and software support provides the mode of automated recuperative braking.

The vehicle differing in the following: the controller hardware and software support provides the mode of wheel controlled braking, and user controls the degree of braking by pressing the brake lever.

The vehicle differing in the following: the controller hardware and software support provides the mode of 'Reverse' movement, and this mode of movement is being activated with a switch.

The purpose of the invention being offered is creation of ecologically sustainable vehicle with high range capacity suitable for use under city conditions including on the walkways and bicycle lanes. The intended purpose is being achieved by use of electric motor integrated in the wheel owing to which the weight of the electric motor provides reliable adhesion of the wheel tire with the road pavement, and at the same time the weight of the electric motor-wheel is not being transmitted in form of a load onto the grips by means of which user handles the vehicle.

BRIEF DESCRIPTION OF THE DRAWINGS

In order to understand the disclosure and to see how it may be carried out in practice, embodiments will now be described, by way of non-limiting examples only, with reference to the accompanying drawings, in which.

DETAILED DESCRIPTION OF EMBODIMENTS

Figure 1:
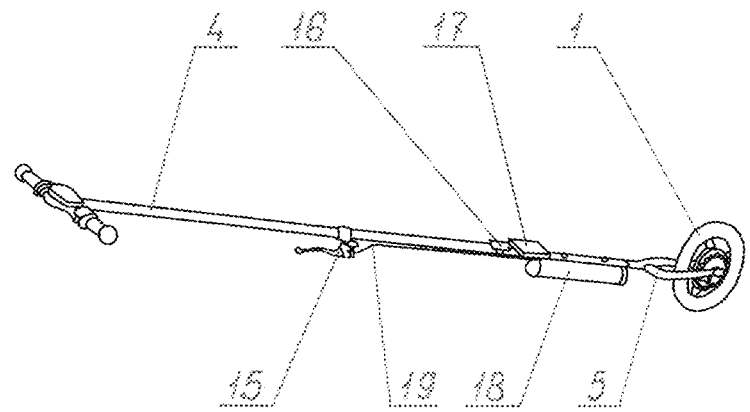
FIG. 1 is a general view of a vehicle in accordance with an example of the presently disclosed subject matter.

Depending on requirements imposed on the vehicle, the invention can be implemented in many different options.

OPTION 1.

Structure of one of the options for design of the vehicle is clarified in the drawings and pictures (FIGS. 1-4).

The vehicle includes a framework, electric drive in form of motor located in the wheel, motor electric power supply system and braking system. In this design option, the vehicle is driven by electric motor and planetary reducer, both integrated in the wheel 1 (FIG. 1). The planetary reducer design envisages an overrunning clutch.

Figure 2:
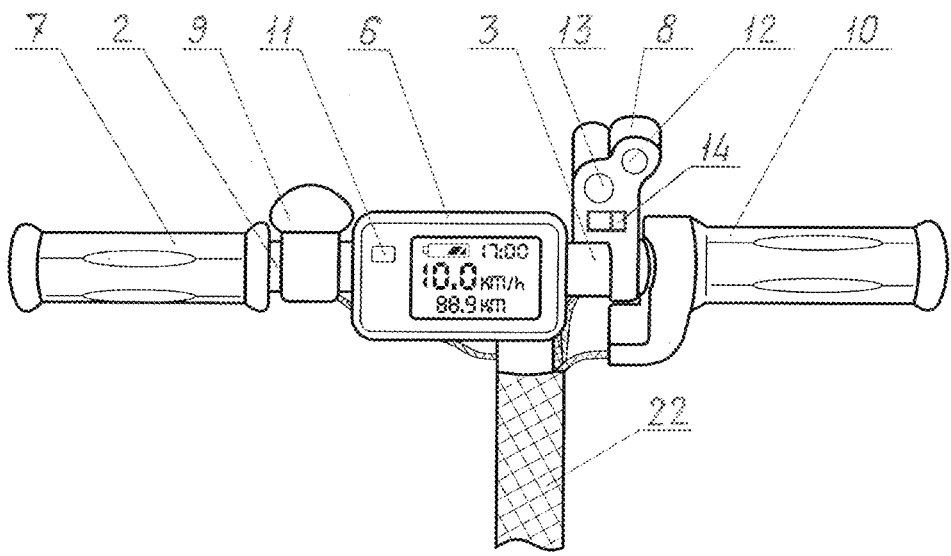
FIG. 2 is a front view of the upper part of the vehicle of FIG. 1.

The framework includes the following parts: left-hand grip 2 (FIG. 2), right-hand grip 3, beam 4 (FIG. 1), fork 5, all rigidly interlinked. Left-hand and right-hand grips carry the following parts secured on them: monitor 6 (FIG. 2), passenger's grip 7, switches unit 8, electronic alarm 9 and speed regulator handlebar 10. The monitor 6 has a button for energizing the vehicle 11 (FIG. 2). Switches unit 8 has: button for actuation of the movement mode 'Cruise control' 12 (FIG. 2), button for actuating the electronic alarm 13 and switch for changeover to 'Reverse' mode 14. Wheel's axle 1 can be rigidly secured in fork 5 (FIG. 3) with use of nuts and washers (not shown). Wheel 1 can be manufactured in form of motor-wheel and can be secured in such a manner that the axle of the motor-wheel along with the electric motor stator are rigidly linked to fork 5, at that the torque is being transmitted from the electric motor rotor through the planetary reducer and overrunning clutch further to the wheel's rim.

Figure 3:
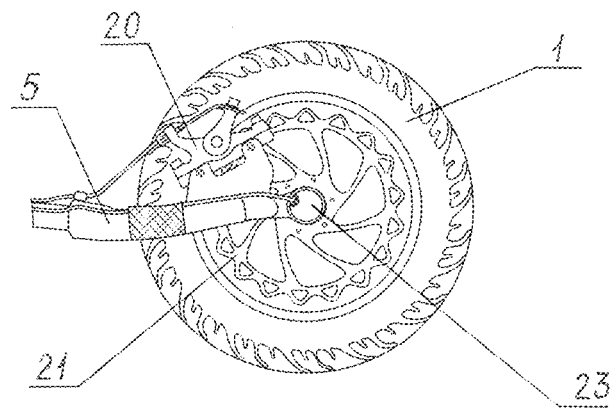
FIG. 3 is a side view of the lower part of the vehicle of FIG. 1.

The brake lever 15 (FIG. 1) and the box 16 accommodating the electrical plug connectors (not shown) connecting the controller 17 to the vehicle's other electrical equipment, are securely mounted on the beam. In addition, the battery 18 (FIG. 1) can be securely mounted on the beam for example underneath the controller. Braking wire cable 19 can include a braided wire and can be extended along the beam from the brake lever 15 (FIG. 1) and to the braking device 20 (FIG. 3). Braking device 20 (FIG. 3) comprises the brake pads (not shown), which upon pressing the brake lever dogs the brake disc 21 (FIG. 3). Brake disc 21 secured on the wheel's hub 1. All the electric wires are secured on the beam 4 (FIG. 1) and fork 5 with use of braid 22 (FIG. 2). Protruding parts of the motor-wheel are covered with rubber hoods 23 (FIG. 3).

Figure 4:
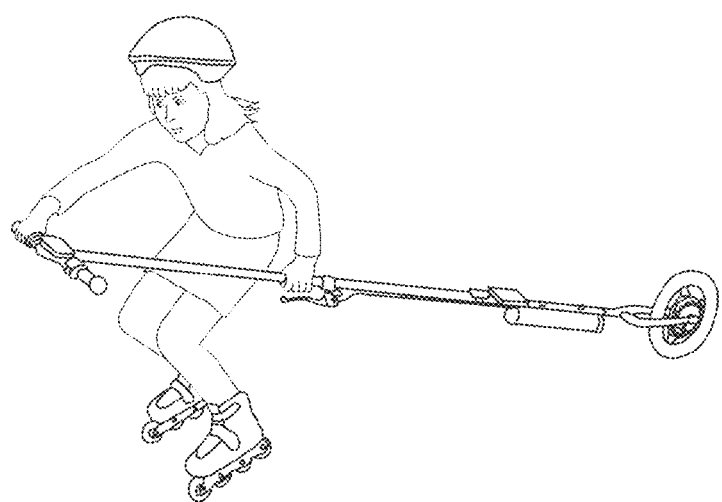
FIG. 4 is a respective view of the vehicle of FIG. 1 in a sport position used by a user on roller skates.

The vehicle can be used in two operation modes depending on user's position relative to the vehicle: sport position and stroller position. In sport position the vehicle operates as follows. User, with roller skates on, takes the vehicle in his arms, stands on a road with even and solid pavement and holds the vehicle in such a way that the beam is aside the user and the motor-wheel is behind him with the wheel's tire standing on the road pavement. On the monitor 6, user presses the button 11 for energizing the vehicle which feeds power supply to controller 17, the controller goes on and starts controlling all the vehicles' electric equipment. The monitor displays the values of parameters in digital format: 'Time', 'Speed', 'Mileage' and also, in graphics, 'Charge'. User holds the speed handlebar with his right hand and with his left hand he supports on the beam as it is shown in FIG. 4. User starts turning the speed regulator handlebar 10, wheel 1 starts rotating, and the vehicle starts moving together with the user who is rolling on roller skates. User controls the vehicle speed by turning the speed regulator handlebar 10, at that the electrical control signal is being transmitted to the controller 17, and the controller increases or decreases the power fed to the electric motor integrated in the motor-wheel. User effects turning of the vehicle by turning his feet in roller skates and also by inclining the wheel's axle. Stopping of the vehicle can be carried out as follows. User presses the brake lever 15; as per electric signal from the relay integrated in the brake lever 15, the controller 17 de-energizes the wheel's electric motor. Additionally, upon pressing the brake lever 15, the brake wire cable 19 is being tightened and the brake pads of the brake device 20 come in touch with the brake disc 21. As a result, the wheel 1 stops rotating and obstructs further movement of the vehicle.

In stroller position the vehicle operates as follows. User, with roller skates on, takes the vehicle in his hands and stands on the road with even solid pavement. On monitor 6, user presses the vehicle energizing button 11 the same way it is being done for sport position. Further, user puts switch 14 in 'Reverse' position. Then user places the vehicle with its wheel ahead and holds it in front of him holding the speed regulator handlebar 10 with his left hand and the passenger's grip 7 with his right hand. User turns the speed handlebar with his left hand, and the wheel 1 starts rotating, and the vehicle starts moving together with the user who is rolling on roller skates. User controls the vehicle's speed by turning the speed regulator handlebar 10. User effects turn of the vehicle by changing the angle of inclination of the wheel's axle and also completes the turn by turning his feet in roller skates. For stopping of the vehicle, user decreases thrust of the motor down to zero by changeover of the speed regulator handlebar to respective position and effects mechanical braking against the road pavement with a brake heel of roller skate.

Consider several cases of the vehicle exploitation for OPTION 1:

The vehicle has a 'Cruise control' mode. Upon activation of this mode, controller 17 tends to maintain the constant angle speed of the motor-wheel's 1 rotation regardless of current load on the vehicle. For activation of 'Cruise control' mode, user first sets proper speed of the vehicle's movement with use of speed regulator handlebar 10, then presses button 'Cruise control' 12. Further, controller 17 tends to maintain the vehicle's speed of movement constant and if the speed rises, for instance on descent, the controller decreases the speed fed to the electric motor; and if the movement speed drops, for instance on ascent, then the controller increases the speed fed to the electric motor. In the movement mode 'Cruise control' adjustment of the speed fed to the electric motor is being done automatically, unattended by user. For deactivation of the movement mode 'Cruise control', user again presses the button 'Cruise control' 12, respective control electric signal arrives at the controller 17, and the controller deactivates the mode.

Accidentally, road pavement has foreign articles and potholes. Normally, wheeled vehicles try to circumvent such road deficiencies to avoid impact of wheels on such obstruction. User of the offered vehicle can avoid such obstructions in different ways; he can not only change trajectory of movement of each foot and vehicle's wheel individually, but also, additionally, slightly raise, if there is a need, left or right leg thus preventing collision with obstruction. Additionally, if it is impracticable to avoid impact of the vehicle's wheel on obstruction, user can transfer the center of gravity and decrease load on the vehicle and thus mitigate the impact force.

Design of this vehicle according to an example can include an additional handlebar 2 for passenger (FIG. 2), at the end of which there is a passenger's grip 7. When using the vehicle in sport position by two people, user and passenger, in roller skates, stand from each side of the vehicle, passenger slightly bending his knees and holding on passenger handlebar and beam of the vehicle.

Monitor 6 of the vehicle allows user to continuously monitor degree of battery charge. However under conditions of real-life operation, it may happen that the battery charge has expired before user arrived at his destination. In such event, user proceeds moving with roller skates on in skating manner, and the vehicle freely rolls towed by user. Integrated in planetary reducer overrunning clutch provides easy overrunning of the wheel. On sheer descents, deenergized vehicle allows user in sport position to safely proceed at a high speed and maintain steady position and also to control the movement speed with use of brake.

The vehicle allows user to travel not only on roller skates but also on skateboard, longboard, penny board, roller skis and off-road roller skates.

The vehicle allows user to travel not only on bituminous road pavement but also on terrain and grass ones, at that user shall use roller skis with rolls of adequate size (e.g. trail-skate, roll diameter of not less than 150 mm) or off-road roller skates.

The vehicle can be fitted with additional appliances:

Mechanical or electronic (electric) alarm. Electronic alarm shall be activated by pressing the respective button and allows user to warn other road traffic participants of approaching of the vehicle;

Stoplight. Stoplight shall be activated by pressing the stop grip and allows user to warn other road traffic participants of braking of the vehicle;

Turn indicator light. Turn indicator light shall be activated and deactivated with use of switch and allows user to warn other road traffic participants of manoeuvre to be performed;

Headlight. Headlight shall be activated and deactivated with use of switch and allows user to safely use the vehicle in the dark;

Parking lights. Parking lights shall be activated and deactivated with use of switch and allow user to safely use the vehicle in the dark;

Wing. Wing is located above the wheel and protects from dirt and splashes both user and assemblies of the vehicle;

Container for carriage of cargoes. Container for carriage of cargoes is secured on the framework and intended for transport of baggage;

Additional wheel. Additional wheel is installed on cantilever aside the driving wheel and provides higher stability. This assembly is expedient for use in cases when it is hard for user to keep the vehicle in working position;

Bumper. User can drop the vehicle or try and reach over the too high curbstone. So, it is expedient to install bumper which absorbs impact and protects the vehicle from damages.

Hardware and software support of the vehicle can envisage following options:

'Reverse' movement mode. This mode is activated by changeover of the switch in respective position. Upon activation of 'Reverse' mode, the controller provides change in direction of the electric motor rotation. 'Reverse' mode is used for movement in leisure mode when the vehicle in stroller position is in front of user;

'Cruise control' movement mode. This movement mode is activated by pressing the button 'Cruise control'. Upon activation of 'Cruise control' mode, the controller starts automatically maintain constant current angle speed of the electric motor rotation. 'Cruise control' movement mode is deactivated by repeated pressing the button 'Cruise control' or upon changeover of speed handlebar to 'maximal speed' position or 'maximal speed' position;

To indicate time. Hardware and software support of the controller envisages the clock function, and the controller can display time value on the monitor in digital or graphical format;

To show timer. Hardware and software support of the controller envisages the feature of determining the summated duration of activation of the controller for all the operation life of the vehicle and display of this indicator on the monitor in digital format;

To display speed value. Hardware and software support of the controller provides calculation of the vehicle's movement speed and display of this indicator on the monitor in digital format;

To display mileage. Hardware and software support of the controller provides calculation of the vehicle's total mileage for entire operation life and display of this indicator on the monitor in digital format;

To display charge. Hardware and software support of the controller provides determining the extent of charge of the power source and display of this indicator on the monitor in digital or graphic format;

To limit the vehicle's maximal movement speed. Hardware and software support of the controller provides limiting the vehicle's movement maximal speed and setting this value in setup. Controller deactivates the electric motor when the vehicle reaches the maximal speed pre-set in setup;

To indicate the wheel's size. Hardware and software support of the controller provides feature of presetting the vehicle wheel's size in setup. This feature is necessary for the controller to calculate 'Speed' and 'Mileage' parameters values;

Interface for communications between the vehicle and smartphone. Hardware and software support of the controller provides interface allowing, with use of installed in smartphone application, to contact the vehicle via Bluetooth channel and get the service information: vehicle's movement speed, vehicle's total mileage, extent of battery charge, vehicle's runtime and other, and also to select personal settings.

As to techniques of configuring the vehicle's drive, the following options are feasible, except for OPTION 1:

OPTION 2

Drive includes the electric drive and wheel in the form of motor-wheel with the motor electric power supply system. Motor-wheel is fitted with electric motor and planetary reducer. As opposed to OPTION 1, overrunning clutch is not used in planetary reducer. This configuration version of the vehicle is compatible with recuperative braking system. Electric motor power supply system is designed similar to that of OPTION 1, but additionally comprises the components providing operation of the recuperative braking system.

OPTION 3

Figure 6:
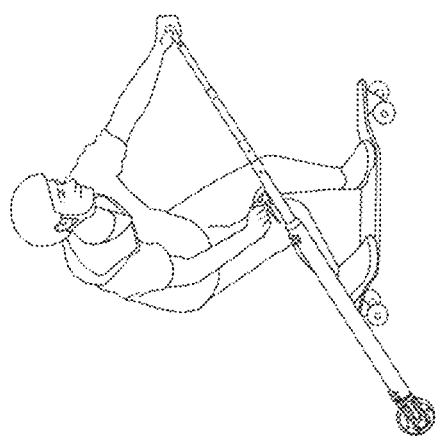
FIG. 6 is a respective view of the vehicle in accordance with yet another example of the presently disclosed subject matter; the vehicle being in the sport position used by a user staying on a longboard.

Drive includes the electric drive in form of motor-wheel with the motor electric power supply system. Motor-wheel is fitted with electric motor. As opposed to OPTION 1, the motor-wheel does not use planetary reducer and overrunning clutch. This configuration version of the vehicle is compatible with recuperative braking system. Motor electric power supply system is designed similar to OPTION 1, but additionally, it can comprise the components providing operation of recuperative braking system. FIG. 6 shows this version of the vehicle's configuration when used by user moving on longboard.

As to techniques of configuring the vehicle's framework, the following options are feasible:

OPTION α

The framework comprises one beam. At one end, the beam is fitted with a fork with a wheel secured therein. The second end of the beam is fitted with a front handlebar. The central part of the beam is fitted with a supporting handlebar so that the central line of the supporting handlebar is parallel to the wheel rotation plane. The supporting handlebar diverges from the beam at an angle, owing to this, in working position, the supporting handlebar is oriented horizontally. Rudder, beam, supporting handlebar and fork are rigidly interlinked. Supporting handlebar is used when the vehicle is exploited in sport position, at that the wheel is behind and aside the user; or for transport of the vehicle. In sport position, user holds with one hand on the front handlebar, with the second hand he holds on the supporting handlebar; and when he transfers his center of gravity and exerts pressure on the vehicle through the supporting handlebar, his hand does not tend to slip through down as the orientation of the supporting handlebar is horizontal.

OPTION β

The framework comprises one beam. One end of the beam is fitted with a fork with a wheel secured therein. Another end of the beam is fitted with left-hand and right-hand grips. On the vehicle with two grips, one grip is intended for user and another for passenger. Both grips, beam and fork are rigidly interlinked.

OPTION γ

The framework comprises one beam. One end of the beam is fitted with a fork with a wheel secured therein. Another end of the beam is bent and parallel to the wheel rotation axle and serves as a grip, at that the handlebar as an individual component of the framework's structure is absent. In such configuration of the framework, towing of passenger is not envisaged.

OPTION δ

The framework comprises one beam, and the beam has a plug connection. The option to disconnect a part of the beam allows decreasing the vehicle's size during its transport.

OPTION ε

The framework comprises one beam, and the beam can be collapsed. The option to collapse the beam allows decreasing the vehicle's size during its transport.

OPTION ζ

Figure 5:
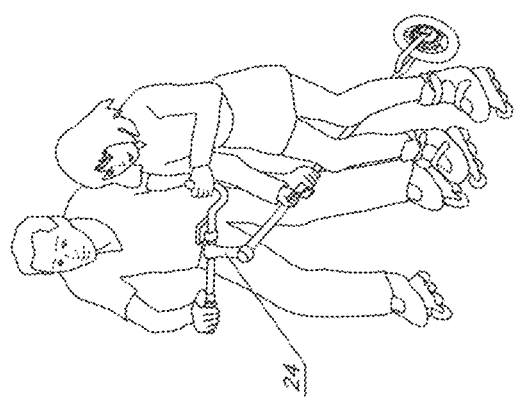
FIG. 5 is a respective view of a vehicle in accordance with another example of the presently disclosed subject matter; the vehicle being in the sport position used by a user on roller skates moving while towing a passenger.

The framework comprises one beam. One end of the beam is fitted with a fork with a wheel secured therein. Another end of the beam is fitted with stem 24 positioned in the plane parallel to the wheel's rotation plane, rudder is secured in the stem (FIG. 5). Rudder, stem, beam and fork are rigidly interlinked.

OPTION η

The framework comprises one beam. One end of the beam is fitted with a fork with a wheel secured therein. Another end of the beam is fitted with a stem secured and oriented in the plane parallel to the wheel's rotation plane. The stem is fitted with asymmetrical rudder secured therein, right-hand grip of which is oriented parallel to the wheel's rotation plane; and left-hand grip has a bend which allows the end of the left-hand grip to be oriented perpendicular to the wheel's rotation plane, at that the end of the left-hand grip, in working position, is oriented vertically. Rudder, stem, beam and fork are rigidly interlinked.

As per techniques of charging and recharging the vehicle can be configured in several options:

OPTION I

For power source, electric drive exploits battery. For charging the battery, the vehicle shall be connected, through special plug connector, to charging device.

OPTION II

For power source, electric drive exploits detachable battery. For charging, the battery shall be detached from the vehicle and connected to charging device.

OPTION III

The vehicle has electric drive comprising, among others, the recuperative braking system. Recuperative braking system provides, during braking, conversion of mechanical energy of the vehicle and user into electric energy. Generated, as a result of braking, electric energy charges the battery. Recuperative braking system is based on the property of reversibility of electric machines. During recuperative braking, electric motor operates in generator mode creating the required moment of resistance and thus providing braking of rotor part. Electric energy is generated by motor-generator either on account of potential energy of the vehicle during its movement on descent or on account of kinetic energy while the vehicle's slowing down. This configuration version of the vehicle is compatible with the drive options: OPTION 2 and OPTION 3.

As per configuration of braking system, the vehicle can be configured in several options:

OPTION a

The vehicle's braking system provides brake lever pressing of which by user initiates braking. The brake lever is fitted on supporting handlebar. When the vehicle is used in sport position and positioned on the left from user, the right-hand front handlebar is being fitted with speed grip, and user holds on it with his right hand, while his left hand grips the supporting handlebar, and at the same place the speed grip is being fitted; at that user can, while continuing gripping the supporting handlebar with his left hand, grip with his fingers the brake lever and perform braking. At such option of arrangement of the brake lever, different control functions are distributed between the user's hands: right hand is responsible for controlling the motor's power, left hand—for braking.

OPTION b

The vehicle's braking system provides two brake levers, pressing of each of them by user initiates braking. One of the brake levers is fitted in the middle part of the beam on the supporting handlebar, another is fitted on the left handlebar. While operation of the vehicle in sport position, user effects braking with the brake lever fitted in the middle part of the beam. While use of the vehicle in stroller position, the wheel is in front of user; user holds the speed grip with left hand, and with right hand he holds on the 'left grip' which is now on the right from him. In stroller position, user brakes with use of brake lever which is installed on the 'left handlebar'.

OPTION c

The vehicle's braking system provides brake lever pressing of which by user initiates braking. As opposed to OPTION a, arrangement of the brake lever is classical as on scooters and motor-bikes—the brake lever is installed above the speed grip.

OPTION d

Mechanical brake is used on the vehicle as a part of braking system. Mechanical brake can be manufactured in form of rim brakes or in form of disc brakes.

Rim brakes operate on account of pressing of the pads to the wheel's rim. Pads are being secured on brake levers which, in turn, are secured moveably on the framework. Upon pressing the brake lever, the brake wire cable is being tightened and the movement of the brake wire cable is transmitted to the pads, and the pads get in contact with the wheel's rim.

Disc brakes operate on the account of pressing the pads to the brake disc which is secured on the wheel's bushing. The pads are located inside the braking device which is secured on the fork. Upon pressing the brake lever, the brake wire cable is being tightened and the movement of the brake wire cable is transmitted to the braking device which brings in action the pads, and the pads get in contact with the braking disc.

Design of the brake lever also makes provision for mechanical relay. Upon pressing the brake lever, the mechanical relay sends electric signal to the controller; by this signal the controller deenergizes the electric motor.

OPTION e

Controlled electric braking is used on the vehicle as a part of braking system. User controls the extent of braking by pressing the brake lever. Extent of pressing of the brake lever is being transduced by sensor into electric signal which is being fed to the controller. The controller changes operation mode of the electric motor, and the electric motor starts operating in generator mode creating a moment of resistance and thus provides braking of the rotor part which is mechanically linked with the wheel.

Technical result of the invention is as follows:
- rise in speed of travel of person on roller skates, skateboard, longboard, penny board, roller skis or off-road roller skates owing to use of drive;
- creation of simple vehicle of high reliability. In particular, when using electric motor with no reducer and no brushes in a motor-wheel, we get a vehicle with minimal number of friction couples. A sole mechanism of drive experiencing friction is a bearing between a rotor and stator. Mass production motor-wheel is sufficiently reliable: allow impacts, travel in rain and insensitive to dirt;

creation of a vehicle with the option of energy recuperation. Based on electric motor-wheel vehicle can be fitted with a recuperative braking system. Recuperative braking system allows to convert mechanical energy into electric energy and charge a battery;

rise in stability while travelling on road solid pavement with imperfections at places (cracks, indents, seams of paving tiles etc.) on the account of optimal mutual position of feet supports and vehicle support;

rise in cross-country ability, in particular a user with roller skates on can negotiate road curbstones.

The invention allows to simplify the design, make the travelling process safer, increase the speed of travelling.

Those skilled in the art to which the presently disclosed subject matter pertains will readily appreciate that numerous changes, variations, and modifications can be made without departing from the scope of the invention, mutatis mutandis.

The invention claimed is:

1. A vehicle comprising:
a framework including at least one beam having a wheel with an integrated electric motor mounted on one end thereof and a braking system;
a handlebar defined on a second end of said beam, said handlebar defining a righthand grip and a passenger grip, said handlebar is asymmetric with respect to said righthand and passenger grips, said asymmetricity is such that said righthand grip is positioned in parallel with the wheel's pivot and being configured to be gripped by a user and said passenger grip has a bend such that one end of the passenger grip is positioned perpendicular to the wheel's pivot, said one end of the passenger grip in working condition where the wheel is engaging the riding surface is positioned vertically and being configured to tow passenger; and
a support grip defined on a middle part of said beam and being configured for supporting of another hand of user, wherein said wheel is configured to rotate relative to said framework, and wherein a center line of the support grip is parallel to a plane of rotation of the wheel, the support grip diverges from the beam at an angle in such that in working condition where the wheel is engaging the riding surface the support grip is oriented horizontally and is disposed along the beam such that at least a portion of the weight of user is exerted thereon together with the weight of the motor increasing thereby the adherence of the wheel tire with the riding surface.

2. The vehicle according to claim 1, wherein the braking system includes a mechanical brake.

3. The vehicle according to claim 1, further comprising a controller for controlling the electric power being fed to the electric motor.

4. The vehicle according to claim 3, wherein the controller controls the mode of automated recuperative braking.

5. The vehicle according to claim 3, wherein the controller controls the mode of the braking system, and configured to allow the user to control the extent of braking by pressing a brake lever.

6. The vehicle according to claim 3, wherein the controller hardware and software control the mode of Reverse movement.

7. The vehicle according to claim 1, wherein the beam is collapsible.

* * * * *